United States Patent [19]
Hemmelgarn et al.

[11] Patent Number: 4,882,847
[45] Date of Patent: Nov. 28, 1989

[54] COORDINATE MEASURING MACHINE WITH IMPROVED CARRIAGE WAY ARRANGEMENT

[75] Inventors: Thomas L. Hemmelgarn, Dayton; Freddie L. Raleigh, Centerville, both of Ohio

[73] Assignee: The Warner and Swasey Company, Cleveland, Ohio

[21] Appl. No.: 305,598

[22] Filed: Feb. 3, 1989

[51] Int. Cl.$^4$ .............................................. G01B 7/03
[52] U.S. Cl. ........................................ 33/503; 33/1 M
[58] Field of Search ................. 33/503, 1 M, 556, 572

[56] References Cited

U.S. PATENT DOCUMENTS

| | | | |
|---|---|---|---|
| 4,175,327 | 11/1979 | Herzog | 33/503 |
| 4,229,866 | 10/1980 | Berthier . | |
| 4,305,207 | 12/1981 | Lantz | 33/503 |
| 4,495,703 | 1/1985 | Sakata et al. | 33/503 |
| 4,594,791 | 6/1986 | Brandstetter . | |
| 4,610,089 | 9/1986 | Bell et al. . | |
| 4,630,374 | 12/1986 | Raleigh . | |
| 4,630,381 | 12/1986 | Sakata et al. | 33/503 |
| 4,682,418 | 7/1987 | Tuss et al. | 33/1 M |
| 4,727,653 | 3/1988 | Fujitani et al. . | |
| 4,790,078 | 12/1988 | Schneider | 33/503 |

FOREIGN PATENT DOCUMENTS 0518161 of 0000 U.S.S.R. .
0621955 of 0000 U.S.S.R. .

Primary Examiner—William A. Cuchlinski, Jr.
Assistant Examiner—Christopher W. Fulton
Attorney, Agent, or Firm—John R. Benefiel; Raymond J. Eifler

[57] ABSTRACT

A coordinate measuring machine (10) of the horizontal arm type having an improved way arrangement for a carriage (40) mounted for movement along one of the orthogonal axes (X) of the machine including a pair of angled upstanding granite way members (24,26) detachably mounted spaced apart atop a granite base member (22), extending parallel to each other and the axis of movement. The way members (24, 26) have inwardly turned opposing overhang portions (28, 30) formed with upper horizontal way surfaces (32,34) and under way surfaces (36,38). The carriage (40) is received in the space between the way members (24,26) and is formed with flanges (42,44) extending over the upper way surfaces (32, 34) with pairs of air bearings (46a,b; 48a,b) interposed. Preload brackets (50,52,54) are attached to the underside of the carriage (40), constructed of a different material to equalize the thermal growth, and have portions (56, 58, 60) extending beneath the under way surfaces (36,38) with pairs of preloading air bearings (62a,b; 64a,b) interposed. Integral pairs of guide legs (66a,b; 68a,b) extend downwardly on either side of a granite guide rail (70) affixed atop the base member (22) with lateral guiding air bearing pairs (76a,b; 78a,b) interposed.

19 Claims, 3 Drawing Sheets

COORDINATE MEASURING MACHINE WITH IMPROVED CARRIAGE WAY ARRANGEMENT

This invention concerns coordinate measuring machines of the type in which a measuring probe is supported on carriages for precisely controlled and measured movement along axes orthogonal to each other. This movement to be over a work piece supporting table so that as the probe tip traverses points on workpiece, accurate measurement of the distance between the points may be achieved.

An example of a vertical probe coordinate measuring machine may be found described in U.S. Pat. No. 4,610,089 issued on Sept. 9, 1986 to Bell et al on a "Bridge Type Coordinate Measuring Machine"; and, an example of a horizontal arm machine is described in U.S. Pat. No. 4,305,207 issued on Dec. 15, 1981 to Lantz on a "Three Axis Inspection Machine".

In these machines, it is critical that non-repeatable distortions of the supporting structures such as the base and carriages be avoided. Such distortions directly cause measurement errors due to a loss of precisely repeatable correspondence between the extent of probe movement and the distance between the points to be measured. The rigidity and weight of the carriages employed to support the probe are thus important factors in the design of such machines, as is the stability of the carriage supporting base structure.

Another significant design factor is the extent to which variations in resistance to movement occur, as with changes in bearing drag with ambient temperature changes, since increased (or decreased) resistance varies the extent of structural deflection imposed by traversing of the probe between points.

Since precision ways are required to support the carriages, the ease of manufacture and repair of these members is important, as is the extent to which damage to the ways by incidental impacts is avoided.

In the context of powered carriages, it is advantageous to center the point of application of the driving forces and minimize any skewing tendency which could introduce nonrepeatable distorting forces acting on the carriage.

A compact structure which encloses the transducing and drive components is also a very desirable feature in these machines.

SUMMARY OF THE INVENTION

The present invention is a coordinate measuring machine having an improved carriage way arrangement comprised of a pair of upstanding way members detachably secured to the upper surface of a base, spaced apart and parallel to an axis of carriage movement. Each way member is elongated and has inwardly slanting upper overhang portions, each extending along the length of the way member and towards the overhang portion of the other way member.

The top surface of each overhang portion defines an upper horizontal way surface. The supported carriage is disposed between the way members and is formed with a pair of first, flange portions, each extending outwardly to overlie a way upper surface, with support air bearings interposed therebetween.

A way undersurface is also defined on the overhang portion of each way member, located directly beneath each upper way surface. The carriage also has second portions comprising downwardly extending detachable brackets having ends extending beneath the undersurface, with preloaded air bearings interposed therebetween to exert a preload on the opposing support bearings.

The way members and base are preferably of granite because of its stability, durability, and low cost characteristics, while the carriage is of light weight metal, i.e., aluminum, to reduce mass. The carriage second portion brackets are constructed of ductile iron to produce approximately even thermal growth compared to the combination of the way member overhangs and the carriage flanges to minimize changes in the support and preload bearing spacing with temperature shifts.

An elongated rail is fixed to the base extending between the carriage brackets and legs and defines vertical guide surfaces engaged by guide bearings located between integral, downwardly extending portions of the carriage, to precisely guide movement along the X axis.

The invention has the advantage of affording a compact, rigid carriage structure, which avoids nonrepeatable loading and thermal distortions tending to produce measurement errors.

The configuration provides protected inner openings for housing carriage drive components and distance transducers, and enabling a centrally located drive of the carriage along the axis of movement.

The base and ways may be easily manufactured while providing accurate, stable support for the carriage. The configuration of the way members reduces the possibilities of damage to the precision surfaces, and are easily repaired and/or replaced.

DETAILED DESCRIPTION

In the following detailed description, certain specific terminolgy will be employed for the sake of clarity and a particular embodiment described but it is to be understood that the same is not intended to be limiting and should not be so construed inasmuch as the invention is capable of taking many forms and variations within the scope of the appended claims.

Figure 1:
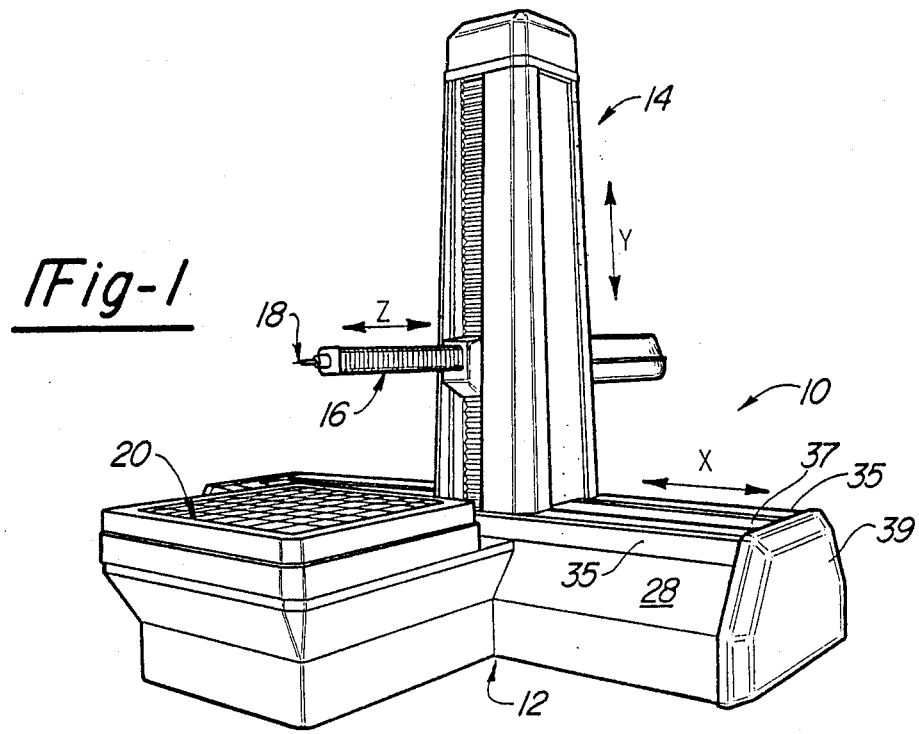
FIG. 1 is a perspective view of a horizontal arm coordinate measuring machine with the improved carriage way arrangement according to the present invention.

FIG. 1 illustrates a horizontal arm type coordinate measuring machine 10, incorporating the improved carriage way arrangement according to the present invention.

Such coordinate measuring machine 10 includes a tee shaped base 12 on which is supported a vertical column assembly 14 movable thereon along a first horizontal coordinate axis, referred to herein as the X-axis. The vertical column assembly 14 movably supports a horizontal arm 16 having a probe tip 18 affixed thereto, the horizontal arm 16 movable thereon along a vertical, second coordinate axis, referred to herein as the Y-axis. The horizontal arm 16 is also movable horizontally along a third or Z axis parallel to the lengthwise axis of the arm 16, with each of the X, Y, and Z axes orthogonal to each other in the manner well known in the art.

The base 12 also supports a rotary table 20 on which a workpiece to be measured (not shown) may be disposed so as to be accessible by the probe tip 18.

Since such coordinate measuring machines are generally well known, the details are not here described save in connection with the present invention, which involves a way arrangement for the X-axis carriage supporting the vertical column assembly 14.

Figure 2:
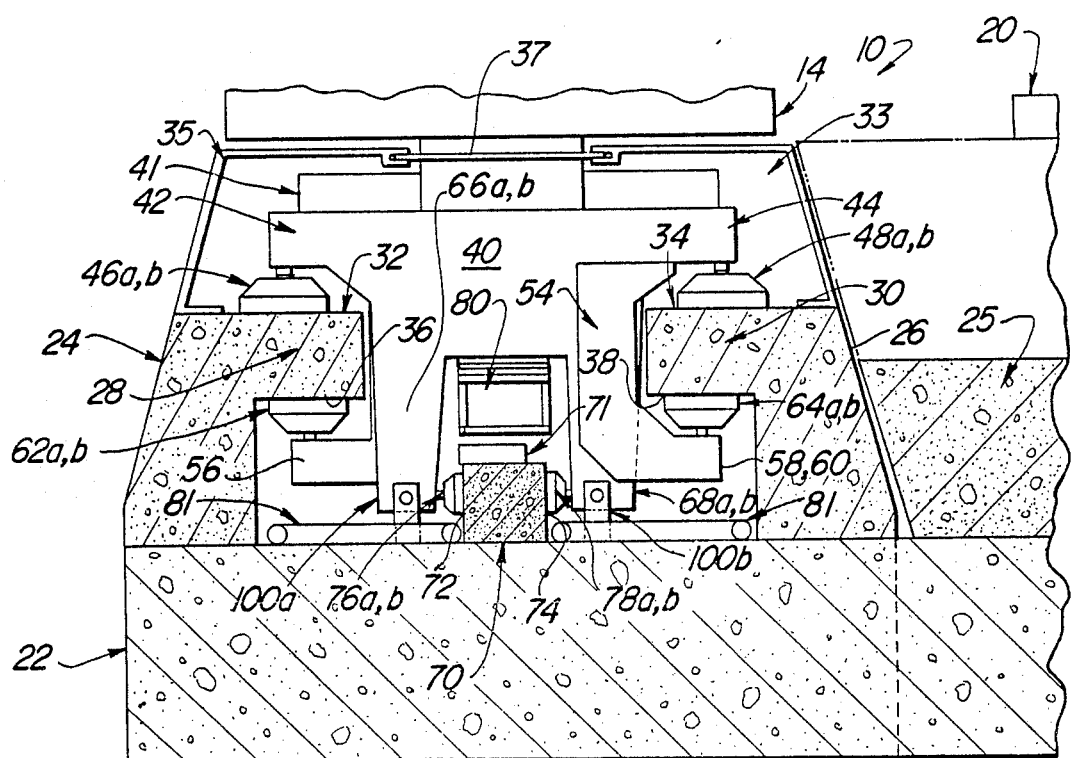
FIG. 2 is a fragmentary side elevational view in partial section of the coordinate measuring machine shown in FIG. 1.

FIG. 2 illustrates details of the way arrangement which includes the base 12, preferably constructed of a granite slab 22 supported on pneumatic isolators 23. Detachably mounted to the base 12, as by bolts (not shown) are a pair of spaced apart upstanding way members 24, 26, each elongated and extending parallel to each other along the X-axis. The way members 24, 26 are each angled inwardly along the upper ends and have opposing overhang portions 28, 30. The top surface of overhang portions 28, 30 are machined to provide accurate upper horizontal way surfaces 32, 34, while the lower opposite surfaces provide undersurface horizontal ways 36, 38 directly beneath the upper way surfaces 32, 34.

An X-axis carriage 40 supports the column assembly 14, attached by a mounting plate 41, and enables linear movement along the X-axis. The carriage 40 is disposed in the space between the angled way members 24, 26. The X-axis carriage 40 is comprised of a machined aluminum casting having integral first portions comprised of outwardly extending wing flanges 42, 44 each overlying a respective one of the upper horizontal ways 32, 34.

An angled cover plate 35 is attached atop each way member 24, 26, and together with a movable dust belt 37 and end caps 39 completely enclose the interior space 33.

Interposed between the flanges 42, 44 and the ways 32, 34, are pairs of support air bearings, rear 46a,b and front 48a, b each bearing in the pairs spaced apart from each other on the X axis carriage 40 in the direction of the X-axis.

The X-axis carriage 40 is formed with second portions comprising a rear bearing support bracket 50, and right and left front bearing support brackets 52 and 54, extending down from the bottom of the X axis carriage 40 into the space between the way members 28, 30, each bracket 50, 52, 54 having end portions 56, 58, 60 respectively extending outwardly beneath the undersurface horizontal ways 36, 38. Interposed therebetween are pairs of preloading air bearings, rear 62a,b, and front 64a,b, each bearing in the pair spaced apart in the direction of the X-axis and located in rough alignment beneath a corresponding support air bearing 46a, or 46b; 48a, or 48b.

The X-axis carriage 40 is also formed with integral third portions comprised of a pairs of laterally spaced guide bearing legs 66a,b; 68a,b straddling a guide rail 70 attached to the surface of the base 12. The guide rail 70 is preferably also constructed of granite and is of narrow width to minimize the effect of difference in thermal growth from the aluminum X axis carriage 40. A steel transducer grating spar 71 is attached to the top of the guide rail 70 in a manner so as to allow relative thermal expansion therebetween, such as by a pin and slot connection (not shown).

Either side of the guide rail 70 is formed with a vertically extending guide surface 72, 74, parallel to the X-axis. Pairs of guide air bearings 76a, b, 78a,b, are interposed between each of the guide bearing legs 66, 68 and a respective guide surface 72, 74.

The guide bearing pairs 76a,b, 78a,b are likewise spaced apart in the direction of the X-axis.

The granite slab 22 extends beneath a granite spacer block 25 bonded thereto and supporting the rotary work table 20.

An X-axis carriage drive arrangement includes a spar and toothed belt assembly 80 extending along the X-axis and passing through the central space between the brackets 50, 52, 54, and legs 66a,b and 68a,b.

Respective wires for motor power control, transducer signal leads, etc., are formed into cables 81, which are looped in the spaces above the slab 22 and within the way members 24, 26, attached to move easily back and forth with the carriage 40.

Figure 3:
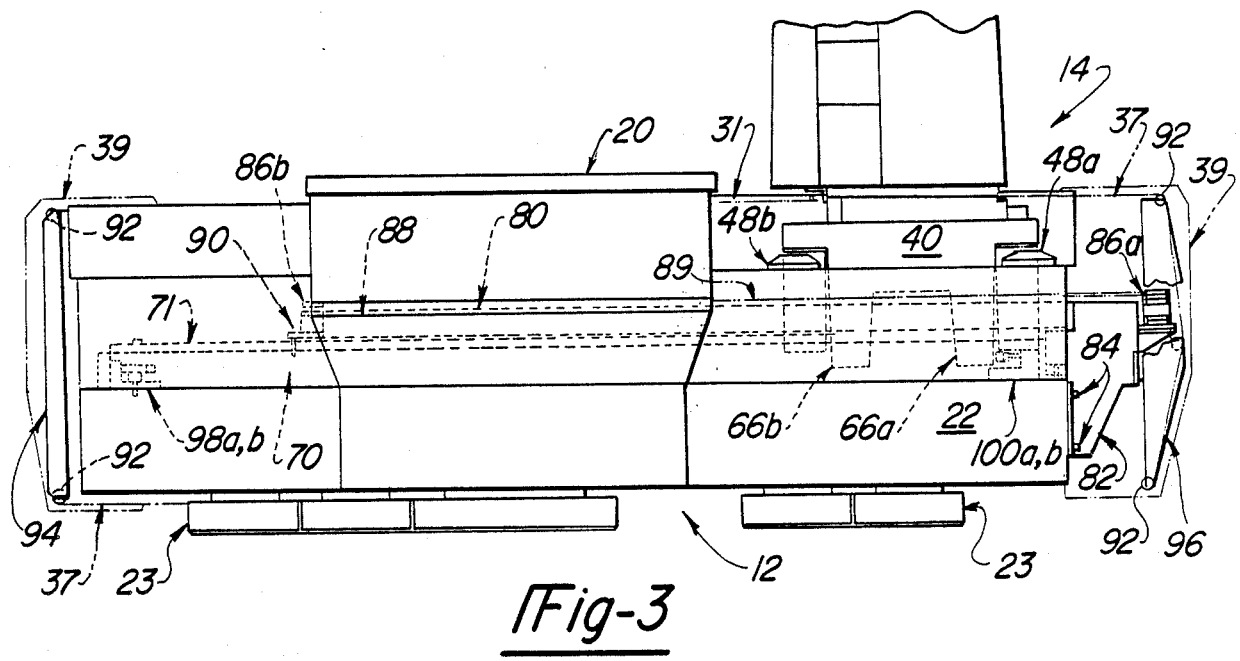
FIG. 3 is a fragmentary front elevational view of the coordinate measuring machine shown in FIGS. 1 and 2.

FIG. 3 illustrates that the spar and belt assembly 80 includes a rigid spar member 88 is affixed at one end to a bracket 82, in turn fixed to one end of the base slab 22 with bolts 84. The rigid spar 88 is simply supported at its opposite end from the bracket 82 with a pin and slotted bracket 90 providing stability while not transmitting compression loads into the rail 70 while allowing free thermal growth in the direction of the X-axis. Both ends of the toothed belt 89 are attached to the spar 88 via flexures 86a and 86b thus allowing minor lateral movement of the belt due to misalignment without exerting significant side loads to bearings 76a,b and 78a,b.

The rigid spar 88 absorbs the load exerted by tensioning of the fixed toothed drive belt 89 also included in the carriage drive assembly 80 to thereby avoid imposing distorting error causing loads on the machine structure itself.

The dust belt 37 is recirculated beneath the slab 22 by a series of rollers 92 supported on brackets 94, 96 at either end of the slab 22, housed within the end caps 39. Pairs of bumper pin stop assemblies 98a,b, 100a,b located at either end of the slab 22 centered on either side of the guide rail 70, engaged by respective leg portions 66a, b and 68a, b, to cushion the shock, and to minimize the load applied to the bearings 76a,b; 78a,b.

Figure 4:
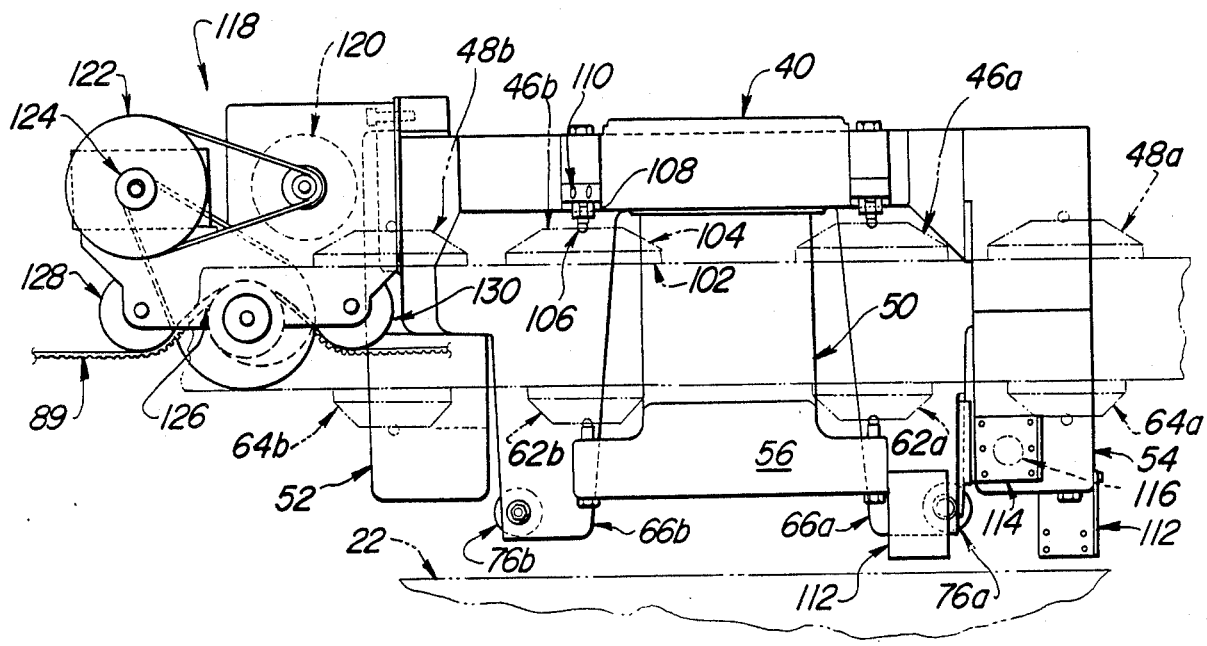
FIG. 4 is an enlarged rear elevational view of the carriage and adjoining structure shown in FIGS. 2 and 3.

FIG. 4 shows that the bottom portion 56 of the rear bracket 50 is relatively wide and supports both rear air preloading bearings 62a, b which are relatively closely spaced, as are the rear support air bearings 46a, b in comparison to the front preload and support bearings 64a, b and 48a, b. This approximates a three point support of the carriage 40 on the ways 32, 34, 36, 38 to lessen the requirement for precise parallelism therebetween.

Each of the air bearings is of a well known design utilized in coordinate measuring machine commercially marketed heretofore. These include a porous bearing pad 102 as of graphite carried by a bearing cap 104 having an internal space supplied with compressed air by plumbing connections (not shown), which air flows out through the porous bearing pad 102 to create an air film providing a bearing support in the well known manner. The cap 104 is supported on a ball 106 received in a conical seat in an adjustable position pin 108 fixed by a clamping bar 110. This arrangement allows slight tilting of the bearing cap 104 and pad 102 to accommodate slight variations in the surface of the way. The air film gap is adjusted by adjusting the position of the pin 108.

Cable holder brackets 112 are attached to the left end of the left hand front preload bearing brackets 54 and the left end of the rear bearing support bracket 50 to which an attached one end of the cables loops 81.

A grating transducer mounting bracket 114 secures the reading head 116 to the left rear guide bearing leg 66a in proper position to scan the grating attached to the grating spar 71.

The carriage drive includes a motor-pulley drive package 118 attached to the left hand end of the carriage as viewed in FIG. 4, including a drive motor 120 and reduction pulleys 122, 124 driving a toothed pulley 126 around which the fixed tooth drive belt 89 is guided by idlers 128, 130. Rotation of the toothed pulley 126 in either direction thus causes linear advance of the X-axis carriage 40 in either direction along the X-axis.

Figure 5:
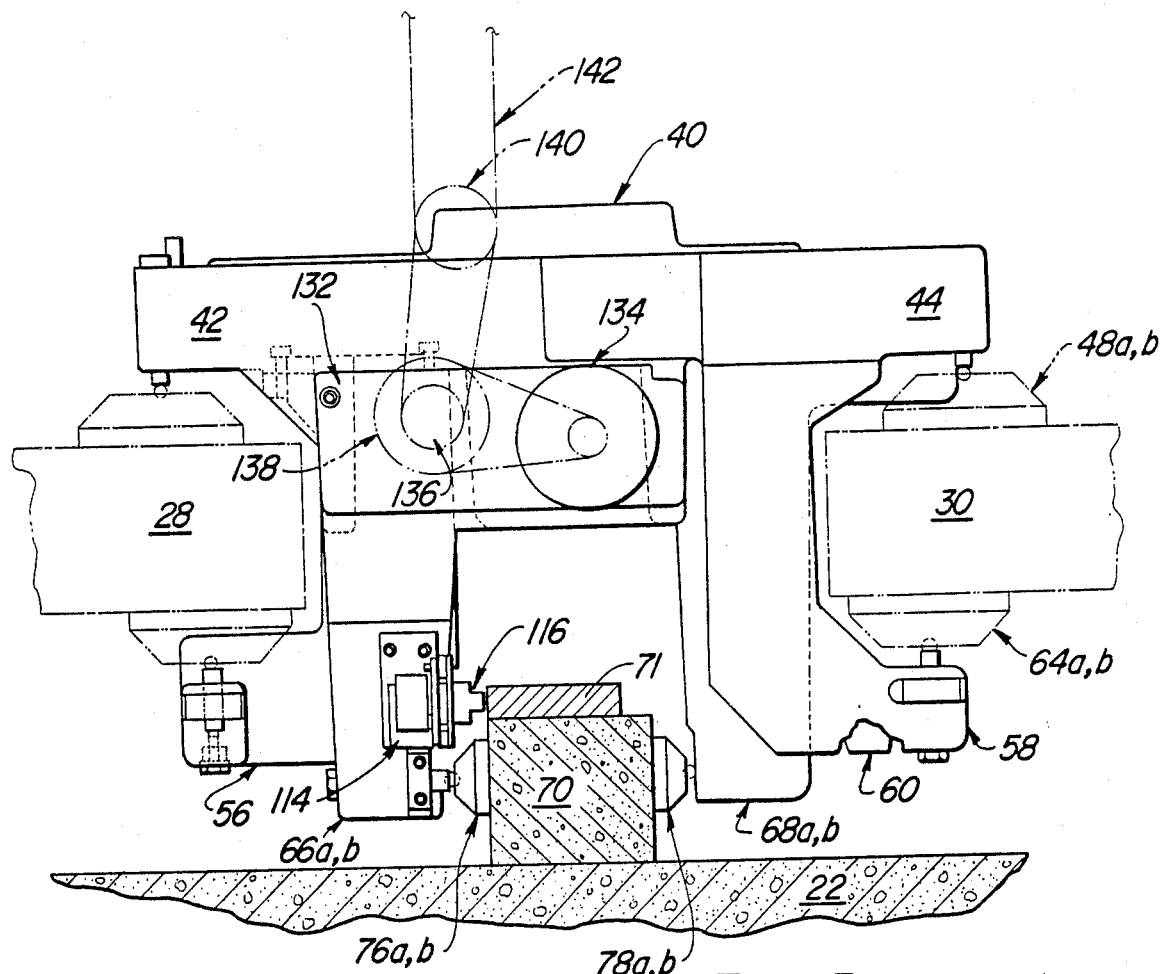
FIG. 5 is an enlarged side elevational view of the carriage and adjoining structure shown in FIGS. 2-4.

FIG. 5 shows that certain drive components of the Y-axis carriage (not shown) are mounted on the X-carriage 40 by a bracket 132 including a drive motor 134, reduction pulleys 136, 138, and a drive sprocket 140 driving an endless belt 142 to which the Y-carriage (not shown) is controllably clutched.

Figure 6:
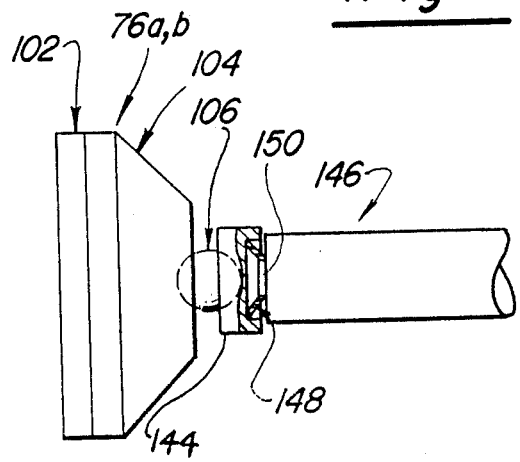
FIG. 6 is an enlarged detail of a spring preloading guide air bearing incorporated in the coordinate measuring machine shown in FIGS. 1-5.

FIG. 6 shows certain of the details of the support for the rear guide air bearings 76a, b. The self aligning ball 106 is received in a seat 144 supported by a spring washer 148 secured on boss 150 at one end of preload pin 146. To exert a preloading pressure. The opposing guide air bearings 78a, b are fixed in a given adjusted position. The preload allows limited variations in spacing between the bearings 76a, b and 78a, b respectively to be taken up to prevent seizing due to thermal growth in the rail 70.

The remaining details of the coordinate measuring machine shown are not here set forth inasmuch as these details do not form a part of the present invention; and, suitable structure is well known to those skilled in the art.

We claim:

1. A coordinate measuring machine (10) having an improved carriage way arrangement, said coordinate measuring machine of the type including a base (12), a probe shaft (16) having a tip (18); mounting means (14, 12) mounting said probe (16) for movement along each of three orthogonal axes (X,Y,Z), said mounting means including a carriage (40) supporting said probe (16), a way arrangement including way surfaces (32,34) extending along one of said axes, supporting way bearing means (46a,b; 48a,b) and guide bearing means (72,74,76a,b; 78a,b) supporting and guiding said carriage (40) for linear movement along said way surface (32,34) (X), characterized by the improvement wherein said way arrangement comprises:

a pair of spaced apart angled elongated way members (24, 26) affixed to a member 22, of said base (12) parallel to each other and to said one axis, each of said way members (24, 26) having an inwardly extending overhang portion (28, 30) defining an upper horizontal way surface (32, 34) each extending along said one (X) axis;

said carriage (40) disposed between said way members (24, 26) and having first portions (42, 44) each extending outwardly to overlie an upper horizontal way surface (32, 34) on a respective way member (24, 26);

said support way bearing means (46a,b; 48a,b) interposed between each of said carriage first portions (42, 44) and a respective way surface (32, 34) enabling carriage movement therealong.

2. The coordinate measuring machine (10) according to claim 1 wherein each of said overhang portions (28, 30) of said respective way members (24, 26) are each formed with a horizontal way undersurface (36, 38) parallel to and beneath said upper horizontal way surface (32, 34);

said carriage (40) including second portions (56, 58, 60) extending outwardly beneath respective horizontal way undersurfaces (36, 38); and, further including bearing preload means (62a, b; 64a, b) acting between said carriage second portions (56, 58, 60) and a respective horizontal way undersurface (36, 38) and exerting a bearing force thereon to preload said support bearings (46a, b; 48a, b).

3. The coordinate measuring machine (10) according to claim 2 wherein said carriage second portions (56, 58, 60) are mounted by downwardly extending brackets (50, 52, 54) attached to said carriage (40); said first portions (42,44) of said upper horizontal way surfaces, said carriage (40), said angled way members (24, 26), and said brackets (50,52,54) are each constructed of materials having dissimilar coefficients of thermal expansion; and wherein the combined thermal expansion of said bearing (48a and 64a), (48b and 64b), (46a and 62a), (46b and 62b) and said overhang portions (28, 30) of said way members (24, 26) substantially equals the thermal expansion of said downwardly extending brackets, whereby said preload of said support bearings (46a, b; 48a, b) is not substantially changed by varying ambient temperatures.

4. The coordinate measuring machine (10) according to claim 1 wherein said support bearings comprise pairs of air bearings (46a,b; 48a,b) spaced apart along the direction of said one (X) axis above either upper horizontal way surface (32, 34).

5. The coordinate measuring machine (10) according to claim 4 wherein said preload bearing means comprises pairs of air bearings (62a,b; 64a,b) spaced apart in a direction along said one (X) axis of movement, each beneath a horizontal way undersurface (36,38), said pairs of preload bearings (62a,b; 64a,b) each positioned approximately aligned and below a respective support air bearing (46a,b; 48a,b).

6. The coordinate measuring machine (10) according to claim 4 wherein one (46a,b) of said pairs of support bearings are relatively closely spaced in the direction of said one (X) axis to approximate a three point support for said carriage (40).

7. The coordinate measuring machine (10) according to claim 1 wherein said guide bearing means includes an elongated rail (70) fixed atop said base member (22) extending along said one (X) axis, and having opposite vertical surfaces (72,74) extending parallel to the direction of said one (X) axis; said carriage (40) having third portions (66a,b; 68a,b) extending downwardly, one on either side of said rail (70); and guide bearings (76a,b; 78a,b) interposed between said third portions (66a,b and 68a,b) and said rail vertical surfaces (72,74).

8. The coordinate measuring machine (10) according to claim 7 wherein said base member (22), said angled way members (24, 26), and said rail (70) are constructed of granite, said carriage (40) first (42,44) and third (66a,b; 68a,b) portions are constructed of aluminum, and said carriage second portions (50, 52, 54) are constructed of ductile iron.

9. The coordinate measuring machine (10) according to claim 8 wherein a steel grating spar (71) is mounted to said guide rail (70) so as to allow relative thermal expansion therebetween.

10. The coordinate measuring machine (10) according to claim 7 wherein said guide bearings comprise pairs of air bearings (76a, b; 78a, b) on either side of said rail (70) spaced apart in the direction of said one (X) axis, each of said air bearings (76a,b) in said pairs aligned with one of the pair of air bearing (78a,b) on the opposite side of said guide rail (70).

11. The coordinate measuring machine (10) according to claim 10 further including spring preload means (148) accommodating variations in the spacing between opposed guide air bearings (76a,b; 78a,b) due to thermal mismatch between said guide rail (70) and carriage (40) by limited deflection of said spring preload means (148).

12. The coordinate measuring machine (10) according to claim 7 wherein said carriage first portions comprise flange portions (42,44) extending horizontally away from the top of said carriage (40) to overlie a respective one of said upper horizontal way surfaces (32,34).

13. The coordinate measuring machine (10) according to claim 11 wherein said carriage second portions comprise downwardly extending brackets (50, 52, 54) detachable from said carriage (40), each of said brackets (50, 52, 54) including an outwardly extending end (56,58,60) extending beneath one of said horizontal way undersurfaces (36, 38).

14. The coordinate measuring machine (10) according to claim 12 wherein said carriage third portions comprise downwardly extending legs (66a,b; 68a,b) integral with said carriage (40), said second and third portions straddling the center of said carriage (40) with a space therebetween.

15. The coordinate measuring machine (10) according to claim 13 further including carriage drive means mounted extending between said carriage brackets (50,52,54).

16. The coordinate measuring machine (10) according to claim 15 wherein said carriage (40) is constructed of aluminum, said way structure (24, 26) of granite and said one or more brackets (50, 52, 54) of ductile iron.

17. The coordinate measuring machine (10) according to claim 1 wherein said coordinate-measuring machine comprises a horizontal arm machine having a horizontally extending probe (16) supported for horizontal axis (Z) movement in the direction of its axis and vertical axis (Y) movement transverse thereto on a vertical column assembly (14); and wherein said vertical column assembly (14) is attached to the top of said carriage (40).

18. The coordinate measuring machine (10) according to claim 1 wherein said upstanding way members are of inverted L-shape and are constructed of granite.

19. In a coordinate measuring machine (10) of the type including a probe (16) supported on a carriage (40), said carriage (40) mounted by bearing means (46a,b; 48a, b) for free movement along an axis (X), said bearing means including a support bearing means (46a,b; 48a,b) supporting the weight of said carriage (40) on an upper surface (32,34) of a structure (24,26) and bearing preload means (62a,b; 64a, b) exerting a bearing force on undersurface (36, 38) of said way structure (24,26), said carriage and way structure having differing coefficients of thermal expansion, the improvement comprising one or more separate detachable brackets (50, 52, 54) extending downwardly from said carriage (40) and mounting said bearing preload means (62a,b; 64a,b), said one or more brackets (50, 52, 54) constructed of a material having a rate of thermal expansion selected to correspond substantially to the composite of the rate of thermal expansion of said bearings (48a and 64a), (48b and 64b), (46a and, 62a), (46b and 62b) and way structure (28, 30).

* * * * *